No. 671,418. Patented Apr. 2, 1901.
C. GULLAND.
CYLINDER PRESSURE CONTROLLER FOR BRAKE SYSTEMS.
(Application filed Jan. 21, 1901.)
(No Model.) 2 Sheets—Sheet 1.
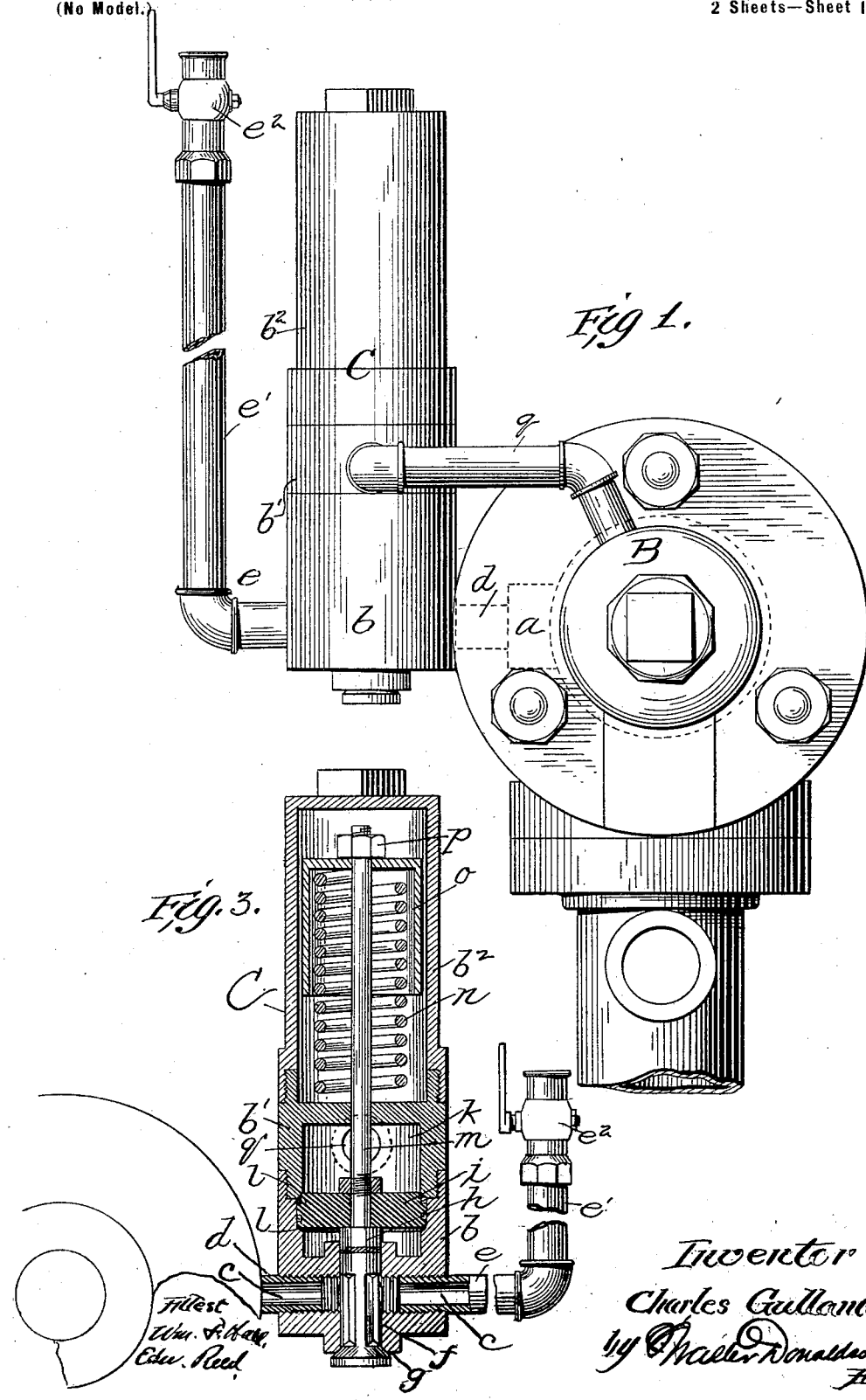

No. 671,418. Patented Apr. 2, 1901.
C. GULLAND.
CYLINDER PRESSURE CONTROLLER FOR BRAKE SYSTEMS.
(Application filed Jan. 21, 1901.)
(No Model.) 2 Sheets—Sheet 2.
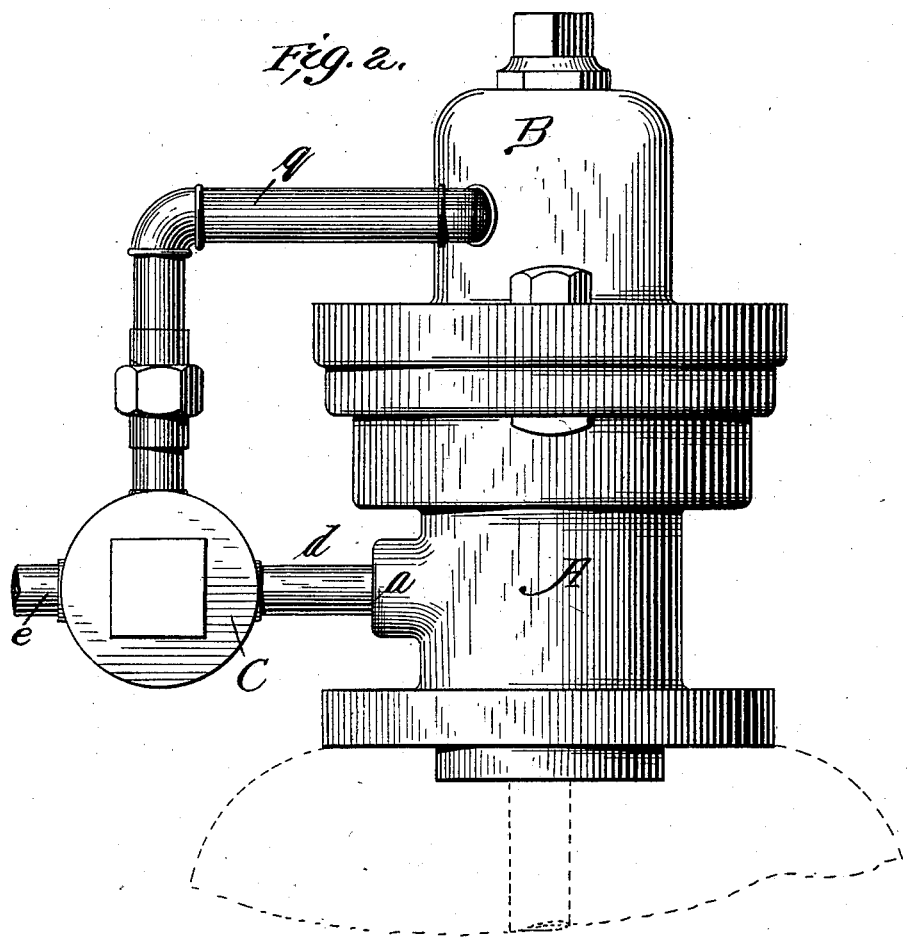

UNITED STATES PATENT OFFICE.

CHARLES GULLAND, OF PITTSBURG, PENNSYLVANIA.

CYLINDER-PRESSURE CONTROLLER FOR BRAKE SYSTEMS.

SPECIFICATION forming part of Letters Patent No. 671,418, dated April 2, 1901.

Application filed January 21, 1901. Serial No. 44,147. (No model.)

*To all whom it may concern:*

Be it known that I, CHARLES GULLAND, a citizen of the United States, residing at Pittsburg, Pennsylvania, have invented certain new and useful Improvements in Cylinder-Pressure Controllers for Brake Systems, of which the following is a specification.

My invention relates to and is connected with the brake system of railway-cars and other vehicles; and its object is to thoroughly govern or control the action of the brakes and to a much greater extent than has heretofore been found possible. I have also aimed to provide a construction capable of use in connection with well-known systems and adapted to be easily applied thereto without material change and operating in such a manner as not to interfere with the well-known action of these systems, and, indeed, in the particular application of my invention, as hereinafter described, I provide for its use in the form of an attachment readily and simply applied to existing constructions and adapted to be used or to be cut out from use when for any reason the ordinary operation of the mechanism may be found desirable—as, for instance, when in a train of cars it is found that less than the whole number are provided with my improvement.

My invention is designed to provide means for controlling the exhaust from the triple valve, comprising a valve normally held closed, independent of and unaffected by the brake-cylinder pressure, and actuated by an increase in the train-pipe pressure.

In the accompanying drawings I have shown one form of my invention as an attachment for application to existing systems, but do not limit myself in this connection, as the structure, location, and arrangement may be materially changed without departing from the spirit of my invention.

Figure 1 shows a plan view of the ordinary cylinder-cap and triple-valve body of the Westinghouse system with my attachment applied thereto. Fig. 2 is an elevation of the same. Fig. 3 is a sectional view of the casing containing the operating parts of the attachment, showing also its relation to the triple-valve body.

I have illustrated the invention for convenience in connection with the triple-valve body and cylinder-cap as used in the Westinghouse system. The valve-casing is shown at A and the cylinder-cap at B, and these parts are unchanged and may be replaced in connection with my invention with similar parts of other systems. At $a$ is shown the ordinary exhaust-port, which heretofore has been open to the atmosphere. At this point, however, my invention supplements the ordinary action, and I connect with this exhaust-port my attachment, which in the form shown consists of a casing C, made, preferably, in several pieces for convenience of manufacture and assembling of the parts. The lower section $b$ is provided with a passage-way $c$, extending through it from side to side, furnishing a means for connecting the section with the pipe $d$ from the exhaust-port on the one side and a pipe $e$ on the other side, which will be hereinafter described and its use explained. Intercepting this passage-way is an opening $f$, extending through the bottom of the section $b$ and terminating in a valve-seat, and closing this opening is a valve $g$. This valve is carried by a stem $h$, which terminates in a piston $i$, this piston being contained within a chamber $k$, formed by the tubular upper end of the section $b$ and a middle section $b'$ of the casing of the attachment. The piston $i$ is provided with packing-rings in its periphery and has a very limited movement between seats $l$, formed in the walls of the chamber $k$. A stem $m$ extends from the piston through the top of the chamber $k$ and into a chamber formed by section $b^2$ of the casing, which incloses a spring $n$, this spring being confined between the bottom of the chamber formed by the upper part of the section $b'$ and a hollow section $o$, fitting over the top of the spring and held in place by a nut $p$, fitting on the threaded end of the stem $m$ above the hollow section $o$. The tension of the spring may be adjusted to a certain pressure, and it will be observed that its tendency is to keep the valve $g$ closed, and this valve can only open when the pressure of the spring has been overcome by a superior pressure. In order to open the valve, I utilize the pressure from the cylinder-cap by a pipe $q$, in communication with the chamber $k$, or instead of making this connection with the cylinder-cap I may make the connection with the train-pipe, it only being necessary to utilize the pressure in the train-pipe, and the most convenient way of taking this pressure will be found the best. It will thus be seen that so long as the valve $g$ remains closed there can be no escape of pressure from the brake-cylinder, as this valve practically closes the ordinary exhaust-port of the triple-valve casing, and hence the auxiliary reservoir can be charged without necessitating the release of pressure in the brake-cylinder, and by the connection between the train-pipe or cylinder-cap and the chamber $k$ the engineer can at any time by sending an increase of pressure through the train-pipe in excess of the pressure of the spring $n$ move the piston $i$ and the valve $g$, and thus release the pressure in the cylinder. This action is thus made independent of the triple-valve action and secures advantages long sought for. The control of the brakes is thus given to the engineer independent of the triple-valve action, and as the valve $g$ governs the release of pressure from the brake-cylinder he may make the action of the brakes just as gradual as he likes, as he can unseat the valve $g$ a greater or less degree, as the conditions may require.

Connected with the pipe $e$ is a pipe $e'$, and this is provided with a cock $e^2$. When this cock is turned so as to be open, the attachment is ineffective and the action is precisely as it is at present, so that this enables the attachment to be cut in or out with the greatest ease.

The valve is balanced and is unaffected by the pressure from the brake-cylinder.

I claim—

1. An attachment for an ordinary triple-valve mechanism controlling the exhaust therefrom, comprising a balanced valve normally closed except to allow the discharge of pressure from the brake-cylinder and opened solely by excess of pressure in the train-pipe, substantially as described.

2. An attachment for a triple-valve mechanism, comprising an exhaust-pipe, a positively-operated valve for controlling the closing or opening of said pipe and a balanced valve normally closing an opening in the exhaust-pipe intermediate of the length thereof, with means for operating said balanced valve, consisting of a connection with the train-pipe, the said valve being opened by excess of pressure in said train-pipe substantially as described.

In testimony whereof I affix my signature in presence of two witnesses.

CHARLES GULLAND.

Witnesses:
HENRY E. COOPER,
L. B. MIDDLETON.